(12) United States Patent
Cai et al.

(10) Patent No.: US 12,165,652 B2
(45) Date of Patent: Dec. 10, 2024

(54) METHOD FOR TRAINING A VOICEPRINT EXTRACTION MODEL AND METHOD FOR VOICEPRINT RECOGNITION, AND DEVICE AND MEDIUM THEREOF

(71) Applicant: Beijing Xiaomi Pinecone Electronics Co., Ltd., Beijing (CN)

(72) Inventors: Guodu Cai, Beijing (CN); Xin Wang, Beijing (CN); Yifeng Wang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 1082 days.

(21) Appl. No.: 17/023,821

(22) Filed: Sep. 17, 2020

(65) Prior Publication Data
US 2021/0335368 A1 Oct. 28, 2021

(30) Foreign Application Priority Data
Apr. 22, 2020 (CN) .......................... 202010324112.8

(51) Int. Cl.
*G10L 17/04* (2013.01)
*G06N 3/08* (2023.01)
(Continued)

(52) U.S. Cl.
CPC ................ *G10L 17/04* (2013.01); *G06N 3/08* (2013.01); *G10L 17/02* (2013.01); *G10L 17/18* (2013.01)

(58) Field of Classification Search
CPC ........... G06N 3/08; G10L 17/02; G10L 17/04; G10L 17/06; G10L 17/18; G10L 17/20
See application file for complete search history.

(56) References Cited

U.S. PATENT DOCUMENTS

| 9,824,692 | B1 * | 11/2017 | Khoury | .................. G10L 15/16 |
| 2015/0178487 | A1 * | 6/2015 | Hu | ........................ G06V 40/40 726/19 |

(Continued)

FOREIGN PATENT DOCUMENTS

| CN | 107492382 A | 12/2017 |
| CN | 108766440 A | 11/2018 |

(Continued)

OTHER PUBLICATIONS

Mao et al. "Learning Salient Features for Speech Emotion Recognition Using Convolutional Neural Networks". Dec. 2014. IEEE Transactions on Multimedia, vol. 16, No. 8, pp. 2203-2213.*

(Continued)

*Primary Examiner* — Randall K. Baldwin
(74) *Attorney, Agent, or Firm* — Finnegan, Henderson, Farabow, Garrett & Dunner, L.L.P.

(57) ABSTRACT

A training method includes: acquiring voice data of a user on a plurality of devices, and extracting acoustic features based on the voice data to construct a training data set; inputting the training data set into a neural network model, training the neural network model, and acquiring a loss function of each training of the neural network model; and determining that the training of the neural network model is completed when the loss function converges, wherein the loss function is a weighted sum of a classification loss function, a reconstruction loss function, a difference loss function, and a similarity loss function.

16 Claims, 8 Drawing Sheets

(51) Int. Cl.
  *G10L 17/02* (2013.01)
  *G10L 17/18* (2013.01)

(56) References Cited

U.S. PATENT DOCUMENTS

| | | |
|---|---|---|
| 2017/0358306 A1 | 12/2017 | Xue |
| 2018/0082692 A1* | 3/2018 | Khoury .................. G10L 17/04 |
| 2019/0102678 A1 | 4/2019 | Chang et al. |
| 2019/0180136 A1* | 6/2019 | Bousmalis ............. G06V 10/72 |
| 2019/0318738 A1 | 10/2019 | Mitsuno et al. |
| 2019/0333521 A1 | 10/2019 | Khoury et al. |
| 2020/0051217 A1 | 2/2020 | Shen et al. |
| 2020/0051260 A1 | 2/2020 | Shen et al. |
| 2021/0050020 A1 | 2/2021 | Li et al. |

FOREIGN PATENT DOCUMENTS

| | | |
|---|---|---|
| CN | 108766445 A | 11/2018 |
| CN | 108958810 A | 12/2018 |
| CN | 109243466 A | 1/2019 |
| CN | 109243467 A | 1/2019 |
| CN | 109346088 A | 2/2019 |
| CN | 109801636 A | 5/2019 |
| CN | 109903774 A | 6/2019 |
| CN | 110265040 A | 9/2019 |
| CN | 110349585 A | 10/2019 |
| CN | 110444214 A | 11/2019 |
| CN | 110491393 A | 11/2019 |
| CN | 110610708 A | 12/2019 |
| CN | 110610709 A | 12/2019 |
| CN | 110675881 A | 1/2020 |
| CN | 110838295 A | 2/2020 |
| CN | 110942777 A | 3/2020 |
| CN | 110970036 A | 4/2020 |
| EP | 3469582 A1 | 4/2019 |
| JP | 2019522810 A | 8/2019 |
| JP | 2019185605 A | 10/2019 |
| JP | 2021117245 A | 8/2021 |
| WO | WO 2017012496 A1 | 1/2017 |
| WO | WO 2020073694 A1 | 4/2020 |

OTHER PUBLICATIONS

Sun, Cunwei, et al. "Voiceprint identification for limited dataset using the deep migration hybrid model based on transfer learning." Sensors 18.7 (2018): 2399. (Year: 2018).*

Zhipeng, Dong, et al. "Voiceprint recognition based on BP Neural Network and CNN." Journal of Physics: Conference Series. vol. 1237. No. 3. IOP Publishing, 2019. (Year: 2019).*

Notice of Reasons for Refusal of Japanese Application No. 2020-156101, issued on Sep. 17, 2021.

Examination Report of Indian Application No. 202044042099, issued on Dec. 1, 2021.

European Search Report in European Application No. 20198729.4, mailed on Mar. 3, 2021.

Konstantinos Bousmalis et al: "Domain Separation Neural Networks", 29th Conference on Neural Information Processing System, (NIPS 2016), Barcelona, Spain, dated Aug. 22, 2016, 15 pages.

Yu Jiangiang et al. "Research on Acoustic Model of Speech Recognition Based on Neural Network with Improved Gating Unit", Journal of Changchun University of Science and Technology (Natural Science Edition), vol. 43, No. 1, Feb. 2020, 8 pages.

* cited by examiner

METHOD FOR TRAINING A VOICEPRINT EXTRACTION MODEL AND METHOD FOR VOICEPRINT RECOGNITION, AND DEVICE AND MEDIUM THEREOF

CROSS-REFERENCE TO RELATED APPLICATION

This application is based upon and claims priority to Chinese Patent Application No. 202010324112.8 filed on Apr. 22, 2020, the disclosure of which is hereby incorporated by reference in its entirety.

TECHNICAL FIELD

The disclosure relates to the technical field of voiceprint processing, and particularly relates to a method for training a voiceprint extraction model and a method for voiceprint recognition, as well as devices and storage mediums thereof.

BACKGROUND

With development of voice technology, voiceprint recognition, as a biometric authentication technology, is gradually applied to various intelligent devices. Common applications include a voiceprint recommendation system, a voiceprint lock function, voiceprint payment, and the like. Voice usually contains channel information, environmental noise information and speaker information. For the voiceprint recognition technology, only the speaker information may need to be acquired. However, it may be difficult to completely separate these types of information, so that a voiceprint recognition system may be greatly affected by channels. Since different voice recording devices may introduce different channel information, the effect may be relatively poor in cross-device applications.

A method is needed to better separate speaker information, e.g., voiceprint features of a speaker, from various types of noise information.

SUMMARY

According to a first aspect of embodiments of the disclosure, a method for training a voiceprint extraction model is provided. The voiceprint extraction model may be a neural network model. The method includes: acquiring voice data of a user on a plurality of devices; extracting acoustic features based on the voice data to construct a training data set; inputting the training data set into the neural network model; training the neural network model; acquiring a loss function of each training of the neural network model; and determining that the training of the neural network model is completed when the loss function converges. The loss function may be a weighted sum of a classification loss function, a reconstruction loss function, a difference loss function, and a similarity loss function.

According to a second aspect of embodiments of the disclosure, a voiceprint recognition device includes: a processor, and a memory configured to store instructions executable by the processor, wherein the processor is configured to: acquire voice data of a user on a plurality of devices; extract acoustic features based on the voice data to construct a training data set; input the training data set into a neural network model; train the neural network model; acquire a loss function of each training of the neural network model; and determine that the training of the neural network model is completed when the loss function converges. The loss function may be a weighted sum of a classification loss function, a reconstruction loss function, a difference loss function, and a similarity loss function.

According to a third aspect of embodiments of the disclosure, a non-transitory computer-readable storage medium has stored therein instructions that, when executed by a processor of a device, cause the device to perform a method for voiceprint recognition, the method including: acquiring voice data of a user on a plurality of devices; extracting acoustic features based on the voice data to construct a training data set; inputting the training data set into a neural network model; training the neural network model; acquiring a loss function of each training of the neural network model; and determining that the training of the neural network model is completed when the loss function converges. The loss function may be a weighted sum of a classification loss function, a reconstruction loss function, a difference loss function and a similarity loss function.

It should be understood that the above general description and the following detailed description are exemplary and explanatory only, and are not intended to limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. On the contrary, they are merely examples of devices and methods consistent with some aspects of the disclosure as recited in the appended claims.

In some embodiments, a method for voiceprint recognition may include: establishing a voiceprint mapping model by learning a mapping relationship between different channels, extracting speaker features from voice obtained by a voice recording device, and binding the speaker features with a user, so as to obtain depth features of the voice on other devices, that is, speaker feature representations of the user on other voice recording devices, according to the voiceprint mapping model between different devices.

However, this method may require additional learning of the mapping relationships between different devices one by one. When there are more devices, more voiceprint mapping models need to be established. With the number of intelligent devices increasing, it may be required to establish a voiceprint model for each of the devices, and in addition, continuous maintenance may be required, which may involve a heavy workload. Moreover, when using these devices, a user may need to register on each of these devices. The operations are repeated and complicated.

Embodiments of the disclosure provide a method for voiceprint recognition. In this method, voice of a user may be acquired by a voice acquisition device which is provided with a trained voiceprint extraction model. Voiceprint features of the user may be acquired by the trained voiceprint extraction model. A correspondence between the voiceprint features and user information may be determined. Information of the user may be acquired when the user performs voiceprint recognition. Voiceprint features of the user may be acquired based on the information of the user. Then voiceprint recognition may be performed on the user based on the voiceprint features of the user. Embodiments of the disclosure further provide a method for training a voiceprint extraction model. After the voiceprint extraction model is trained by this method, voiceprint features of a user may be extracted from the acquired voice of the user, so as to achieve better separation of the voiceprint features from channel noise.

In the method for voiceprint recognition of the disclosure, a unified trained voiceprint extraction model is applicable to different devices, so that the workload can be greatly reduced, and a system is easier to be maintained. In addition, when a user needs to use the model, the user may only need to register on one device and then can use the model on other devices, thereby improving the user experience.

Figure 1:
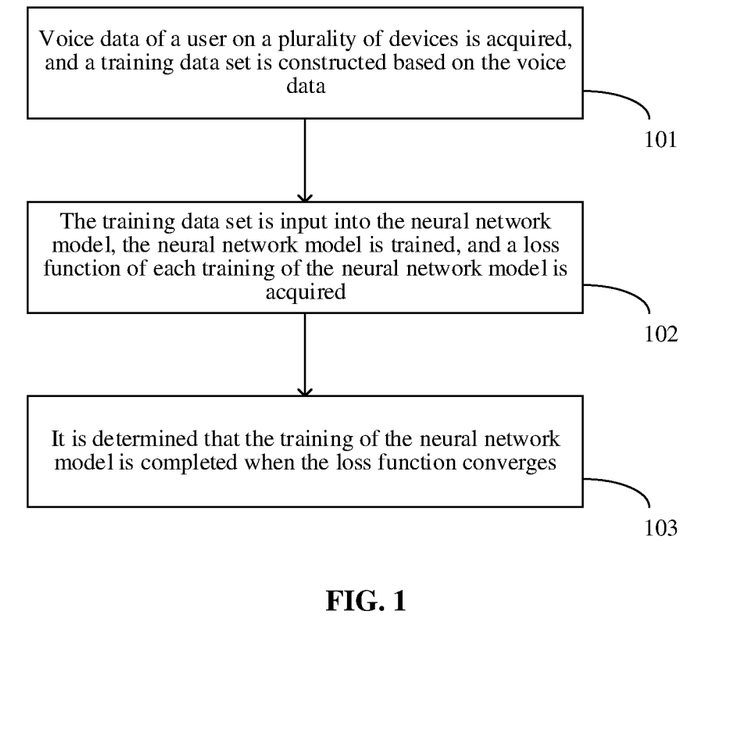
FIG. 1 is a flowchart of a method for training a voiceprint extraction model according to an exemplary embodiment.

FIG. 1 is a flowchart of a method for training a voiceprint extraction model according to an exemplary embodiment. For example, the voiceprint extraction model is a neural network model. As shown in FIG. 1, the method includes the following operations.

In operation 101, voice data of a user on a plurality of devices, e.g., T devices, is acquired, and acoustic features are extracted based on the voice data to construct a training data set. T may be a positive integer greater than or equal to 2.

In operation 102, the training data set is input into the neural network model, the neural network model is trained, and a loss function of each training of the neural network model is acquired.

In operation 103, it is determined that the training of the neural network model is completed when the loss function converges.

The loss function may be a weighted sum of a classification loss function, a reconstruction loss function, a difference loss function, and a similarity loss function.

The voiceprint extraction model may be a neural network model known to those skilled in the art, such as a deep neural network model. The voiceprint extraction model may be a unified model independent of devices. In this model, a shared space and a private space may be respectively established for data from different channels. The shared space may be shared by different channels and configured to learn shared features, that is, the voiceprint features of a speaker. The private space may be limited by each of the channels and configured to learn the private features of each of the devices, that is, the channel noise generated by each of the devices. Therefore, the representations of audio data in the shared space may be speaker voiceprint features independent of channels, that is, speaker voiceprint features may be independent of devices.

Figure 2:
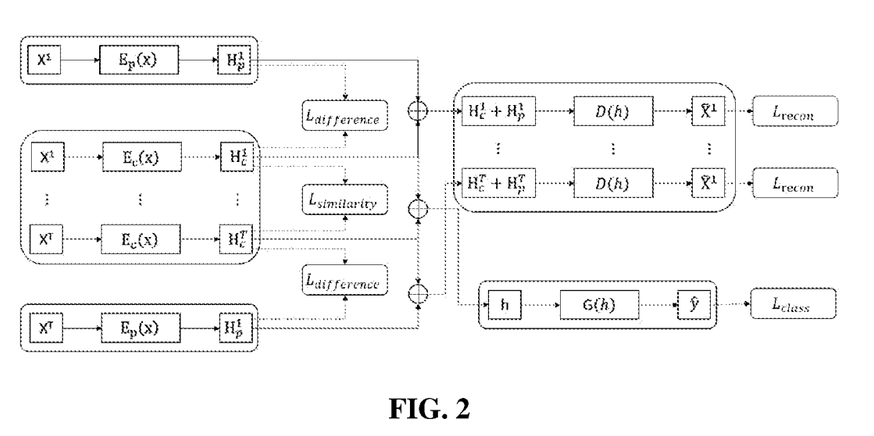
FIG. 2 is a schematic diagram of a network structure of a voiceprint extraction model according to an exemplary embodiment.

FIG. 2 is a schematic diagram of a deep neural network model according to an exemplary embodiment. In FIG. 2, $X^{1, 2, \ldots, T}$: a training set, where T represents the total number of devices;

$E_c(x)$: a shared space encoder for extracting shared features $h_c$ of different devices;

$E_p(x)$: a private space encoder for extracting private features $h_p$ of different devices respectively;

$D(h)$: a decoder for decoding and reconstructing hidden features h extracted by the encoder;

$G(h)$: a predictor for predicting the hidden features h extracted by the encoder to obtain a predicted label $\hat{y}$;

$\hat{x}=D(E_c(x)+E_p(x))$: performing decoding and reconstruction after an X code is input;

$\hat{y}=G(E_c(x))$: performing prediction after an X code is input;

$H_c^t$ and $H_p^t$: hidden layer feature matrices obtained by encoding device subspaces through the shared space encoder and the private space encoder;

$L_{class}$: a classification loss function for predicting a final output label;

$L_{recon}$: a reconstruction loss function for ensuring that private space features may act on learning objectives;

$L_{difference}$: a difference loss function for representing orthogonality between the shared space and the private space; and $L_{similarity}$: a similarity loss function for ensuring that a network can extract similarity features of different devices.

The above modules, other than the difference loss function and the similarity loss function, may be acquired by those skilled in the art by a deep neural network model.

In an embodiment, a loss function L of the deep neural network model may be expressed as:

$$L = \lambda L_{class} + \alpha L_{recon} + \beta L_{difference} + \gamma L_{similarity}$$

$\lambda$, $\alpha$, $\beta$ and $\gamma$ represent weights of a classification loss function, a reconstruction loss function, a difference loss function and a similarity loss function, respectively. These weights may be updated during a training process of the deep neural network model. The loss function of each round of training may be acquired by updating the weights. In an embodiment, the updating of weights may be implemented by those skilled in the art based on the training of the deep neural network model.

In this method, by introducing the difference loss function and the similarity loss function into the loss function of the deep neural network model, better separation of voiceprint features from channel noise can be implemented.

In an embodiment, acquiring the loss function of each training of the neural network model may include: voiceprint feature information and channel noise information are acquired from each training of the neural network model; and the difference loss function is calculated based on the voiceprint feature information and the channel noise information.

In an embodiment, the difference loss function $L_{difference}$ may be calculated by the following formula:

$$L_{difference} = \sum_{t=1}^{T} \|H_c^{tT} H_p^t\|_F^2,$$

wherein $\|\cdot\|_F^2$ represents the square of the F-norm. Other types of norms may also be used for calculation. $H_c^t$ and $H_p^t$ respectively represent a voiceprint feature matrix and a channel noise matrix obtained during each training of the neural network model. The orthogonality between the voiceprint features and the channel noise may be obtained by the difference loss function. The orthogonality between the two parameters may represent the independency between the two parameters. Therefore, when the orthogonality between the voiceprint features and the channel noise is smaller, the separation of the voiceprint features from the channel noise is better.

In an embodiment, acquiring the loss function of each training of the neural network model may include: voiceprint feature information obtained during each training of the neural network model is acquired; the voiceprint feature information is processed to remove a relevance between the voiceprint feature information and a channel to which the voiceprint feature information belongs; the processed voiceprint feature information is input into a domain classifier of the neural network model; and the similarity loss function is acquired based on the classification result of the domain classifier and the classification correctness probability of output of the neural network model.

In an embodiment, to ensure that different subspaces are transferable, it may be required to ensure that the distribution of the shared features $H_c^t$ has similarity. Accordingly, the voiceprint feature information may be processed to remove the relevance between the voiceprint feature information and the channel to which the voiceprint feature information belongs, and then, the processed voiceprint feature information may be input into the domain classifier, so that the domain classifier is unable to distinguish which subspace the input comes from, so as to ensure that a network can extract similarity features of different devices, that is, acquiring common features of the input, namely shared features. The similarity loss function is defined as follows:

$$L_{similarity} = \sum_{t=1}^{T}\sum_{i=0}^{N} d_i^t * \log \hat{d}_i^t$$

wherein d represents a classification result of each sentence in voice of a speaker by the domain classifier (a shared feature is classified to a device to which the shared feature belongs, namely, a channel). The value may be 0 or 1. When the classification is correct, the value is 1. When the classification is incorrect, the value is 0. $\hat{d}_i^t$ represents a probability value of correct classification output by the neural network model, and the value may be between 0 and 1.

In an embodiment, processing the voiceprint feature information to remove the relevance between the voiceprint feature information and the channel to which the voiceprint feature information belongs may include: the voiceprint feature information is processed by gradient inversion.

In an embodiment, the gradient inversion may be performed synchronously in a training process of a network. After the gradient inversion is performed on voiceprint feature information, the entire network may not distinguish which device the input voice comes from, so as to achieve the purpose of acquiring shared features of the input voice.

In addition, a classification loss function $L_{class}$ may be expressed as:

$$L_{class} = -\left(\sum_{t=1}^{T}\sum_{i=0}^{N} y_i^t * \log \hat{y}_i^t\right),$$

wherein N represents the number of sentences contained in acquired voice of a speaker, $y_i^t$ represents input real voice, and $\hat{y}_i^t = G(E_c(x_i^t))$ represents voice predicted by a model.

The reconstruction loss function $L_{recon}$ may be calculated by the following formula:

$$L_{recon} = \sum_{t=1}^{T}\sum_{i=0}^{N} L_{si\_mse}(x_i^t, \hat{x}_i^t),$$

wherein $L_{si\_mse}$ is a scale-invariant mean square error loss function which may be calculated by the following formula:

$$L_{si\_mse}(x_i^t, \hat{x}_i^t) = \frac{1}{k}\|x-\hat{x}\|_2^2 - \frac{1}{k^2}([x-\hat{x}]\cdot 1_k),$$

wherein k represents a dimension of input x, $1_k$ represents a matrix with an element 1 and a length k, and $\|\cdot\|_2^2$ represents an $L_2$-norm. Other types of norms may also be used for calculation.

In an embodiment, the classification loss function and the reconstruction loss function may be calculated by existing methods. The classification loss function may be softmax, or other optimized varieties of softmax, such as A-Softmax, L-Softmax and AM-Softmax. Similarly, the reconstruction loss function may be other functions other than the scale-invariant mean square error, which is not limited here.

Figure 3:
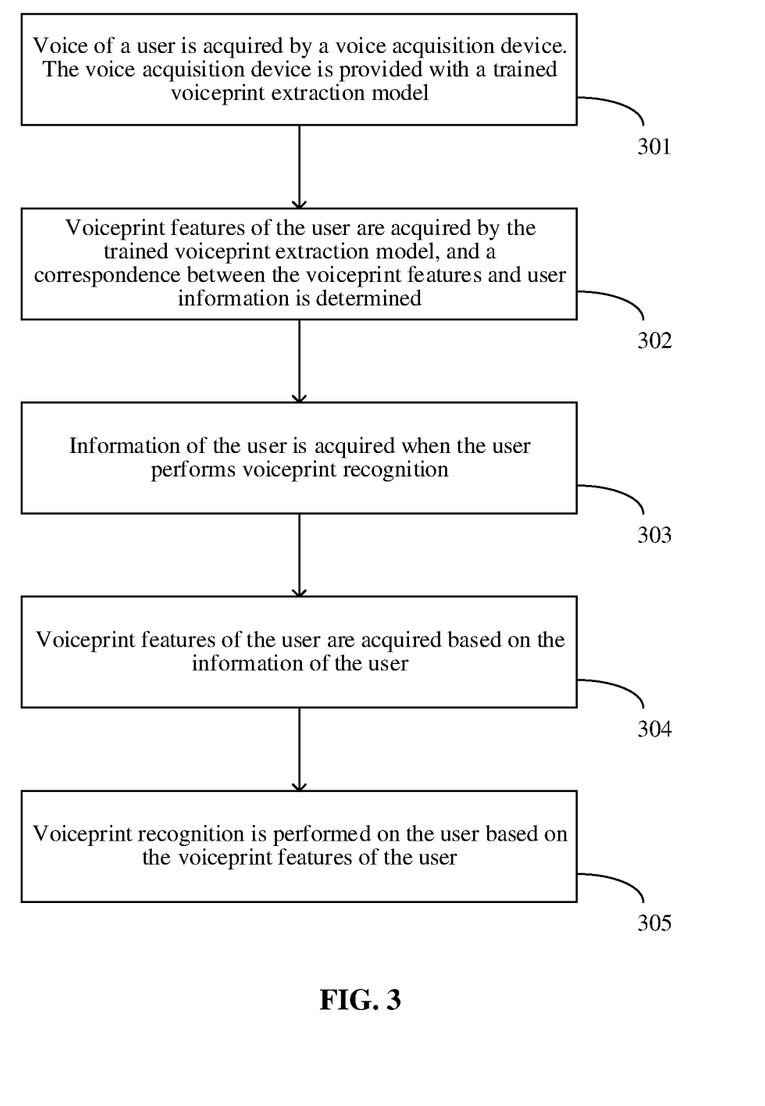
FIG. 3 is a flowchart of a method for voiceprint recognition according to an exemplary embodiment.

Embodiments of the disclosure further provide a method for voiceprint recognition. As shown in FIG. 3, the method includes the operations as below.

In operation 301, voice of a user is acquired by a voice acquisition device. The voice acquisition device is provided with a trained voiceprint extraction model.

In operation 302, voiceprint features of the user are acquired by the trained voiceprint extraction model, and a correspondence between the voiceprint features and user information is determined.

In operation 303, information of the user is acquired when the user performs voiceprint recognition.

In operation 304, voiceprint features of the user are acquired based on the information of the user.

In operation 305, voiceprint recognition is performed on the user based on the voiceprint features of the user.

The method for voiceprint recognition is implemented by using the voiceprint extraction model trained by the above-described method for training a voiceprint extraction model. That is, the trained voiceprint extraction model in the operation 301 is trained by the above-described method for training a voiceprint extraction model. The trained voiceprint extraction model may well separate voiceprint features from channel noise. Therefore, after voice of a user is input into the trained voiceprint extraction model, voiceprint features of the user may be acquired. The voiceprint features may be in one-to-one correspondence to the information of the user. Then, the above trained voiceprint extraction model may be shared on different voice acquisition devices. Based on information registered by the user on a certain device, voiceprint features in one-to-one correspondence to the information may be acquired, and voiceprint recognition may be performed on the user based on the voiceprint features.

In an embodiment, the method may further include storing the determined correspondence between the voiceprint features and the user information in memory.

The operation that the voiceprint features of the user are acquired based on the information of the user may include that the voiceprint features of the user are acquired from the memory based on the information of the user.

In an embodiment, the memory may be cloud memory. When a user performs voiceprint recognition on other devices, the user information in a cloud terminal may be taken to conduct matching to recognize the user. Corresponding operations may be completed according to voice instructions of the user.

Figure 4:
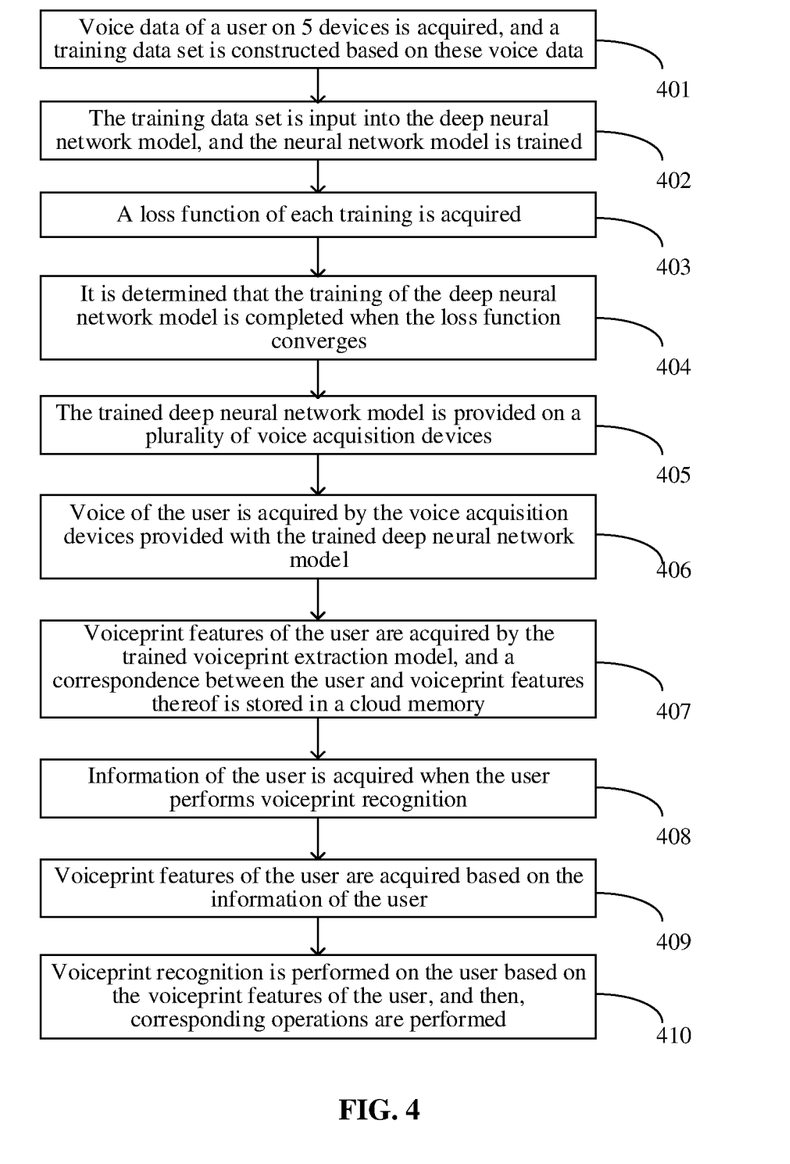
FIG. 4 is a flowchart of a method for voiceprint recognition according to an exemplary embodiment.

FIG. 4 is a flowchart of a method for voiceprint recognition according to an exemplary embodiment. In the embodiment, the voiceprint extraction model is a deep neural network model. As shown in FIG. 4, the method includes the following operations.

In operation 401, voice data of a user on 5 devices is acquired, and a training data set is constructed based on these voice data.

In operation 402, the training data set is input into the deep neural network model, and the neural network model is trained.

In operation 403, a loss function of each training is acquired.

In operation 404, it is determined that the training of the deep neural network model is completed when the loss function converges.

In operation 405, the trained deep neural network model is provided on a plurality of voice acquisition devices.

In operation 406 includes that voice of the user is acquired by the voice acquisition devices provided with the trained deep neural network model.

In operation 407, voiceprint features of the user are acquired by the trained voiceprint extraction model, and a correspondence between the user and voiceprint features thereof is stored in a cloud memory.

In operation 408, information of the user is acquired when the user performs voiceprint recognition.

In operation 409, voiceprint features of the user are acquired based on the information of the user.

In operation 410, voiceprint recognition is performed on the user based on the voiceprint features of the user, and then, corresponding operations are performed.

In this method, voice of a user may be acquired by a voice acquisition device. The voice acquisition device may be provided with a trained voiceprint extraction model. Voiceprint features of the user may be acquired by the trained voiceprint extraction model. A correspondence between the voiceprint features and user information may be determined. Information of the user may be acquired when the user performs voiceprint recognition. Voiceprint features of the user may be acquired based on the information of the user. Then voiceprint recognition may be performed on the user based on the voiceprint features of the user. The disclosure further provides a method for training a voiceprint extraction model. After the voiceprint extraction model is trained by this method, voiceprint features of a user may be extracted from the acquired voice of the user, so as to achieve better separation of the voiceprint features from channel noise.

In the method for voiceprint recognition of the disclosure, a unified trained voiceprint extraction model is applicable to different devices, so that the workload can be greatly reduced, and a system is easier to be maintained. In addition, when a user needs to use the model, the user only needs to register on one device and then can use the model on other devices, thereby improving the user experience.

Figure 5:
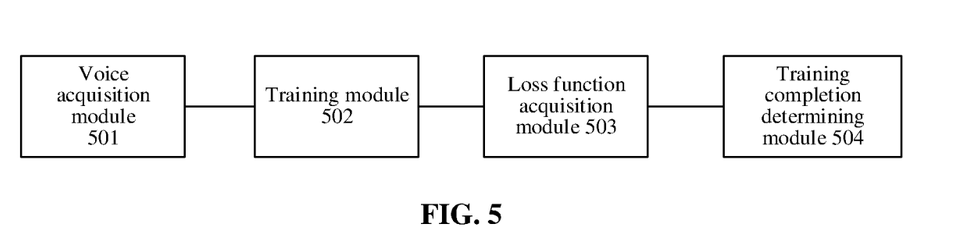
FIG. 5 is a block diagram of a device for training a voiceprint extraction model according to an exemplary embodiment.

Embodiments of the disclosure further provide a device for training a voiceprint extraction model. The device is applicable to a neural network model. As shown in FIG. 5, the device includes: a voice acquisition module 501 configured to acquire voice data of a user on a plurality of devices, such as T devices, and extract acoustic features based on the voice data to construct a training data set, wherein T is a positive integer greater than or equal to 2; a training module 502 configured to input the training data set into the neural network model and train the neural network model; a loss function acquisition module 503 configured to acquire a loss function of each training of the neural network model; and a training completion determining module 504 configured to determine that the training of the neural network model is completed when the loss function converges.

The loss function may be a weighted sum of a classification loss function, a reconstruction loss function, a difference loss function, and a similarity loss function.

In an embodiment, the loss function acquisition module 503 is further configured to: acquire voiceprint feature information and channel noise information from each training of the neural network model; and calculate the difference loss function based on the voiceprint feature information and the channel noise information.

In an embodiment, the loss function acquisition module 503 is further configured to: acquire voiceprint feature information from each training of the neural network model; process the voiceprint feature information to remove a relevance between the voiceprint feature information and a channel to which the voiceprint feature information belongs; input the processed voiceprint feature information into a domain classifier of the neural network model; and acquire the similarity loss function based on a classification result of the domain classifier and a classification correctness probability of output of the neural network model.

In an embodiment, the loss function acquisition module 503 is further configured to: process the voiceprint feature information by gradient inversion to remove the relevance between the voiceprint feature information and the channel to which the voiceprint feature information belongs.

Figure 6:
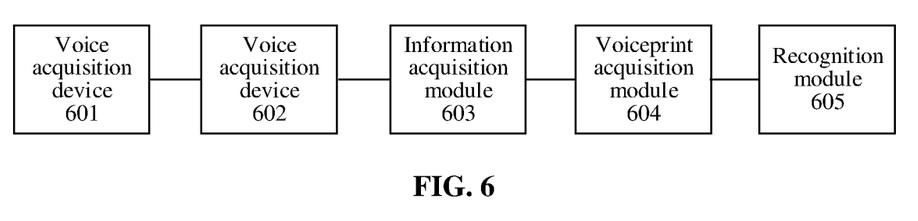
FIG. 6 is a block diagram of a voiceprint recognition device according to an exemplary embodiment.

Embodiments of the disclosure further provide a voiceprint recognition device. As shown in FIG. 6, the device may further include: a voice acquisition device 601 configured to acquire voice of a user, where the voice acquisition device is provided with a trained voiceprint extraction model; a relationship determining module 602 configured to acquire voiceprint features of the user by the trained voiceprint extraction model and determine a correspondence between the voiceprint features and user information; an information acquisition module 603 configured to acquire information of the user when the user performs voiceprint recognition; a voiceprint acquisition module 604 configured to acquire voiceprint features of the user based on the information of the user; and a recognition module 605 configured to perform voiceprint recognition on the user based on the voiceprint features of the user.

In an embodiment, the device may further include: a storage module configured to store the determined correspondence between the voiceprint features and the user information in memory.

The voiceprint acquisition module is further configured to acquire the voiceprint features of the user from the memory based on the information of the user.

With respect to the device in the above embodiments, the specific manners for performing operations by individual modules therein have been described in detail in the embodiments regarding the method, which will not be repeated herein.

Embodiments of the disclosure provides a method for voiceprint recognition. In this method, voice of a user is acquired by a voice acquisition device which is provided with a trained voiceprint extraction model. Voiceprint features of the user may be acquired by the trained voiceprint extraction model. A correspondence between the voiceprint features and user information may be determined. Information of the user may be acquired when the user performs voiceprint recognition. Voiceprint features of the user may be acquired based on the information of the user. Then voiceprint recognition may be performed on the user based on the voiceprint features of the user. The disclosure further provides a method for training a voiceprint extraction model. After the voiceprint extraction model is trained by this method, voiceprint features of a user may be extracted from the acquired voice of the user, so as to achieve better separation of the voiceprint features from channel noise.

In the method for voiceprint recognition of the disclosure, a unified trained voiceprint extraction model is applicable to different devices, so that the workload can be greatly reduced, and a system is easier to be maintained. In addition, when a user needs to use the model, the user only needs to register on one device and then can use the model on other devices, thereby improving the user experience.

Figure 7:
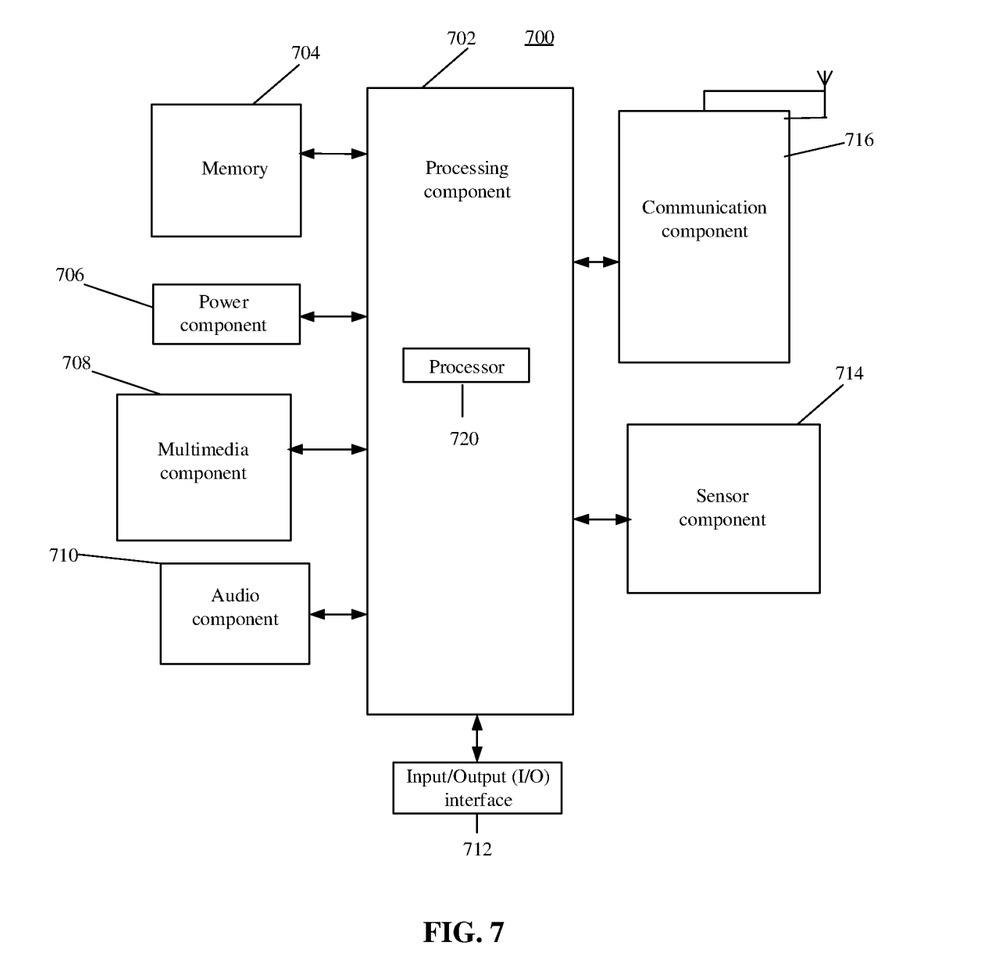
FIG. 7 is a block diagram of a device according to an exemplary embodiment.

FIG. 7 is a block diagram of a device 700 according to an exemplary embodiment. For example, the device 700 may be a device for training a voiceprint extraction model or a device for voiceprint recognition. Referring to FIG. 7, the device 700 may include one or more of the following components: a processing component 702, memory 704, a power component 706, a multimedia component 708, an audio component 710, an Input/Output (I/O) interface 712, a sensor component 714, and a communication component 716.

The processing component 702 generally controls overall operations of the device 700, such as operations related to displaying, telephone calls, data communications, camera operations, and recording operations. The processing component 702 may include one or more processors 720 to execute instructions to complete all or part of the operations of the method described above. In addition, the processing component 702 may include one or more modules to facilitate the interaction between the processing component 702 and other components. For example, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, videos, etc. The memory 704 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 706 is configured to provide power to various components of the device 700. The power component 706 may include a power management system, one or more power sources, and any other components associated with the generation, management and distribution of power in the device 700.

The multimedia component 708 may include a screen that provides an output interface between the device 700 and a user. In some embodiments, the screen may include a Liquid Crystal Display (LCD) and a Touch Panel (TP). If the screen includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 708 includes a front camera and/or a rear camera. The front camera and the rear camera may receive external multimedia data while the device 700 is in an operation mode, such as a photographing mode or a video mode. Each front camera and each rear camera may be fixed optical lens systems or may have focal lengths and optical zoom capabilities.

The audio component 710 is configured to output and/or input audio signals. For example, the audio component 710 includes a microphone (MIC), and the microphone is configured to receive external audio signals when the device 700 is in an operation mode, such as a calling mode, a recording mode, and a voice identification mode. The received audio signals may be further stored in the memory 704 or transmitted via the communication component 716. In some embodiments, the audio component 710 may further include a speaker configured to output audio signals.

The I/O interface 712 is configured to provide an interface between the processing component 702 and peripheral interface modules, which may be keyboards, click wheels, buttons, etc. These buttons may include, but not limited to: a home button, a volume button, a start button, and a lock button.

The sensor component 714 may include one or more sensors configured to provide various aspects of state assessment for the device 700. For example, the sensor component 714 may detect an open/closed status of the device 700, and relative positioning of components. For example, the components are the display and the keypad of the device 700. The sensor component 714 may also detect a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of objects nearby without any physical contact. The sensor component 714 may also include light sensors, such as CMOS or CCD image sensors, for use in imaging applications. In some embodiments, the sensor component 714 may also include an acceleration sensor, a gyroscope sensor, a magnetic sensor, a pressure sensor, or a temperature sensor.

The communication component 716 is configured to facilitate wired or wireless communication between the device 700 and other devices. The device 700 may access a wireless network based on a communication standard, such as WiFi, 4G or 5G, or a combination thereof. In an exemplary embodiment, the communication component 716 receives broadcast signals or broadcast related information from an external broadcast management system via a broadcast channel. In an exemplary embodiment, the communication component 716 may further include a Near Field Communication (NFC) module to facilitate short-range communications. In an exemplary embodiment, the communication component 716 can be implemented based on the Radio Frequency Identification (RFID) technology, the Infrared Data Association (IrDA) technology, the Ultra-Wideband (UWB) technology, the Bluetooth (BT) technology and other technologies.

In exemplary embodiments, the device 700 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method.

In exemplary embodiments, a non-transitory computer readable storage medium storing instructions, such as the memory 704 storing instructions, is also provided. The instructions may be executed by the processor 720 of the device 700 to complete the above methods. For example, the non-transitory computer-readable storage medium may be a ROM, a Random Access Memory (RAM), a CD-ROM, a magnetic tape, a soft disk, an optical data storage device or the like.

A non-transitory computer-readable storage medium is provided. When an instruction in the storage medium is executed by a processor of a mobile terminal, the mobile terminal may execute a method for training a voiceprint extraction model, including: voice data of a user on T devices is acquired, and acoustic features are extracted based on the voice data to construct a training data set, where T is a positive integer greater than or equal to 2; the training data set is input into the neural network model, the neural network model is trained, and a loss function of each training of the neural network model is acquired; and it is determined that the training of the neural network model is completed when the loss function converges, wherein the loss function is a weighted sum of a classification loss function, a reconstruction loss function, a difference loss function and a similarity loss function.

Figure 8:
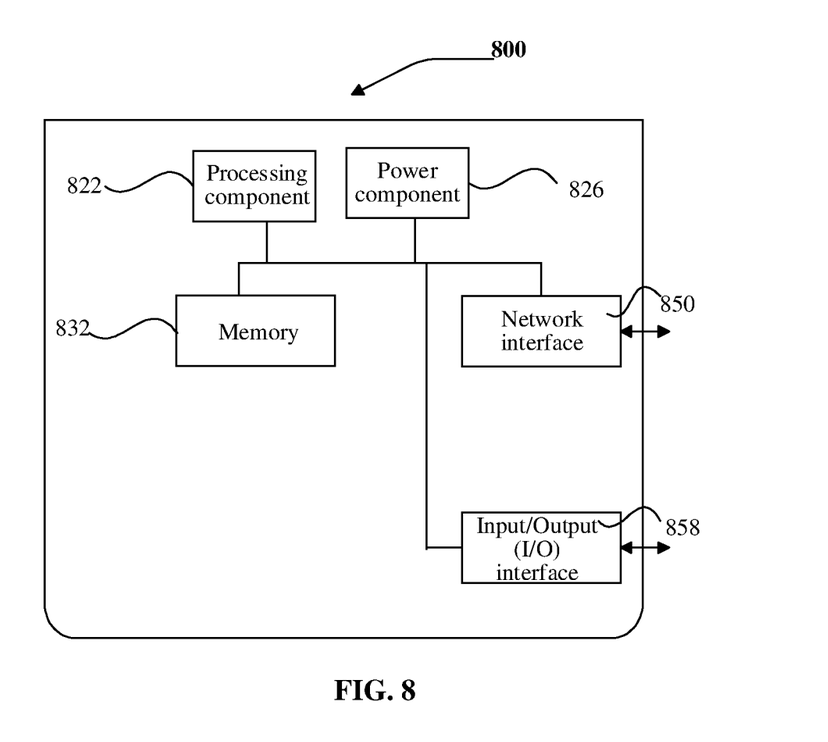
FIG. 8 is a block diagram of a device according to an exemplary embodiment.

FIG. 8 is a block diagram of a device 800 according to an exemplary embodiment. For example, the device 800 may be a device for training a voiceprint extraction model or a device for voiceprint recognition. Also for example, the device 800 may be provided as a server. Referring to FIG. 8, the device 800 includes a processing component 822, further including one or more processors and memory resources represented by memory 832 for storing instructions executable by the processing component 822, such as application programs. The application program stored in the memory 832 may include one or more modules which each corresponds to a set of instructions. Furthermore, the processing component 822 is configured to execute the instructions to execute the above method: voice data of a user on T devices is acquired, and acoustic features are extracted based on the voice data to construct a training data set, wherein T is a positive integer greater than or equal to 2; the training data set is input into the neural network model, the neural network model is trained, and a loss function of each training of the neural network model is acquired; and it is determined that the training of the neural network model is completed when the loss function converges, wherein the loss function is a weighted sum of a classification loss function, a reconstruction loss function, a difference loss function and a similarity loss function.

The device 800 may also include a power component 826 configured to execute power management of the device 800, a wired or wireless network interface 850 configured to connect the device 800 to the network, and an Input/Output (I/O) interface 858. The device 800 may operate an operating system stored in the memory 832, such as Windows Server™, Mac OS X™, Unix™, Linux™, FreeBSD™ or the like.

Other embodiments of the disclosure will be apparent to those skilled in the art from consideration of the specification and practice of the disclosure herein. The disclosure is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for training a voiceprint extraction model, the voiceprint extraction model being a neural network model, the method comprising:
acquiring voice data of a user on a plurality of devices by a voice acquisition device;
extracting acoustic features by a processor based on the voice data to construct a training data set;
inputting the training data set into the neural network model by the processor;
training the neural network model by the processor;
acquiring a loss function of each training of the neural network model by the processor; and
determining by the processor that the training of the neural network model is completed when the loss function converges,
wherein the loss function is a weighted sum of a classification loss function, a reconstruction loss function, a difference loss function, and a similarity loss function,
the difference loss function represents orthogonality between a shared space and a private space and is calculated by a formula $$L_{difference} = \sum_{t=1}^{T} \left\| H_c^{tT} H_p^t \right\|_F^2,$$

where $\|\cdot\|_F^2$ represents a square of a F-norm, $H_c^t$ and $H_p^t$ respectively represent a voiceprint feature matrix and a channel noise matrix obtained during each training of the neural network model, and
the similarity loss function is configured for a network to extract similarity features of different devices, and is defined as $$L_{similarity} = \sum_{t=1}^{T} \sum_{i=0}^{N} d_i^t * \log \hat{d}_i^t,$$

wherein d represents a classification result, obtained by a domain classifier of the neural network model, of each sentence in voice of a speaker, a value of d is 0 or 1, $\hat{d}_i^t$ represents a probability value of correct classification output by the neural network model, and a value of $\hat{d}_i^t$ is between 0 and 1, wherein the shared space is shared by different channels and is configured to learn voiceprint features of the speaker, and the private space is limited by each of the different channels and is configured to learn channel noise generated by each of the different devices.

2. The method of claim 1, wherein the acquiring the loss function of each training of the neural network model comprises:
   acquiring voiceprint feature information and channel noise information from each training of the neural network model; and
   calculating the difference loss function based on the voiceprint feature information and the channel noise information.

3. The method of claim 1, wherein the acquiring the loss function of each training of the neural network model comprises:
   acquiring voiceprint feature information from each training of the neural network model;
   processing the voiceprint feature information to remove a relevance between the voiceprint feature information and a channel to which the voiceprint feature information belongs;
   inputting the processed voiceprint feature information into the domain classifier of the neural network model; and
   acquiring the similarity loss function based on a classification result of the domain classifier of the neural network and a classification correctness probability of output of the neural network model.

4. The method of claim 3, wherein the processing the voiceprint feature information to remove the relevance between the voiceprint feature information and the channel to which the voiceprint feature information belongs comprises:
   processing the voiceprint feature information by gradient inversion.

5. A method for voiceprint recognition using the voiceprint extraction model trained by the method of claim 1, the method for voiceprint recognition comprising:
   acquiring voice of a user by the voice acquisition device, wherein the voice acquisition device is provided with the trained voiceprint extraction model;
   acquiring voiceprint features of the user by the trained voiceprint extraction model and determining a correspondence between the voiceprint features and user information;
   acquiring information of the user when the user performs voiceprint recognition;
   acquiring the voiceprint features of the user based on the information of the user; and
   performing voiceprint recognition on the user based on the voiceprint features of the user.

6. The method of claim 5, further comprising:
   storing the determined correspondence between the voiceprint features and the user information in memory; and
   the acquiring the voiceprint features of the user based on the information of the user comprises:
   acquiring the voiceprint features of the user from the memory based on the information of the user.

7. A device for training a voiceprint extraction model, the voiceprint extraction model being a neural network model, the device comprising:
   a processor; and
   a voice acquisition device,
   wherein the processor is configured to:
   control the voice acquisition device to acquire voice data of a user on a plurality of devices, and extract acoustic features based on the voice data to construct a training data set;
   input the training data set into the neural network model and train the neural network model;
   acquire a loss function of each training of the neural network model; and
   determine that the training of the neural network model is completed when the loss function converges,
   wherein the loss function is a weighted sum of a classification loss function, a reconstruction loss function, a difference loss function, and a similarity loss function,
   the difference loss function represents orthogonality between a shared space and a private space and is calculated by a formula $$L_{difference} = \sum_{t=1}^{T}\|H_c^{tT}H_p^{t}\|_F^2,$$

where $\|\cdot\|_F^2$ represents a square of a F-norm, $H_c^t$ and $H_p^t$ respectively represent a voiceprint feature matrix and a channel noise matrix obtained during each training of the neural network model, and
   the similarity loss function is configured for a network to extract similarity features of different devices, and is defined as $$L_{similarity} = \sum_{t=1}^{T}\sum_{i=0}^{N} d_i^t * \log \hat{d}_i^t,$$

wherein d represents a classification result, obtained by a domain classifier of the neural network model, of each sentence in voice of a speaker, a value of d is 0 or 1, $\hat{d}_i^t$ represents a probability value of correct classification output by the neural network model, and a value of $\hat{d}_i^t$ is between 0 and 1,
   wherein the shared space is shared by different channels and is configured to learn voiceprint features of the speaker, and the private space is limited by each of the different channels and is configured to learn channel noise generated by each of the different devices.

8. The device of claim 7, wherein the processor is further configured to:
   acquire voiceprint feature information and channel noise information from each training of the neural network model; and
   calculate the difference loss function based on the voiceprint feature information and the channel noise information.

9. The device of claim 7, wherein the processor is further configured to:
   acquire voiceprint feature information from each training of the neural network model;
   process the voiceprint feature information to remove a relevance between the voiceprint feature information and a channel to which the voiceprint feature information belongs;
   input the processed voiceprint feature information into the domain classifier of the neural network model; and
   acquire the similarity loss function based on a classification result of the domain classifier of the neural network and a classification correctness probability of output of the neural network model.

10. The device of claim 9, wherein the processor is further configured to:

processing the voiceprint feature information by gradient inversion to remove the relevance between the voiceprint feature information and the channel to which the voiceprint feature information belongs.

11. A device for voiceprint recognition using the voiceprint extraction model trained by the device of claim 7, the device for voiceprint recognition comprising:

a processor; and
a memory configured to store instructions executable by the processor;
wherein the processor is configured to:
acquire voice of a user by the voice acquisition device, wherein the voice acquisition device is provided with the trained voiceprint extraction model;
acquire voiceprint features of the user by the trained voiceprint extraction model and determine a correspondence between the voiceprint features and user information;
acquire information of the user when the user performs voiceprint recognition;
acquire the voiceprint features of the user based on the information of the user; and
perform voiceprint recognition on the user based on the voiceprint features of the user.

12. The device of claim 11, wherein:

the memory is configured to store the determined correspondence between the voiceprint features and the user information; and
the processor is further configured to acquire the voiceprint features of the user from the memory based on the information of the user.

13. A non-transitory computer-readable storage medium, having stored therein instructions that, when executed by a processor of a device, cause the device to perform a method for training a voiceprint extraction model, the voiceprint extraction model being a neural network model, the method comprising:

acquiring voice data of a user on a plurality of devices;
extracting acoustic features based on the voice data to construct a training data set;
inputting the training data set into the neural network model;
training the neural network model;
acquiring a loss function of each training of the neural network model; and
determining that the training of the neural network model is completed when the loss function converges,
wherein the loss function is a weighted sum of a classification loss function, a reconstruction loss function, a difference loss function, and a similarity loss function,
the difference loss function represents orthogonality between a shared space and a private space and is calculated by a formula $$L_{difference} = \sum_{t=1}^{T} \|H_c^{tT} H_p^t\|_F^2,$$

where $\|\cdot\|_F^2$ represents a square of a F-norm, $H_c^t$ and $H_p^t$ respectively represent a voiceprint feature matrix and a channel noise matrix obtained during each training of the neural network model, and the similarity loss function is configured for a network to extract similarity features of different devices, and is defined as $$L_{similarity} = \sum_{t=1}^{T} \sum_{i=0}^{N} d_i^t * \log \hat{d}_i^t,$$

wherein d represents a classification result, obtained by a domain classifier of the neural network model, of each sentence in voice of a speaker, a value of d is 0 or 1, $\hat{d}_i^t$ represents a probability value of correct classification output by the neural network model, and a value of $\hat{d}_i^t$ is between 0 and 1, wherein the shared space is shared by different channels and is configured to learn voiceprint features of the speaker, and the private space is limited by each of the different channels and is configured to learn channel noise generated by each of the different devices.

14. The non-transitory computer-readable storage medium of claim 13, wherein acquiring the loss function of each training of the neural network model comprises:

acquiring voiceprint feature information and channel noise information from each training of the neural network model; and
calculating the difference loss function based on the voiceprint feature information and the channel noise information.

15. The non-transitory computer-readable storage medium of claim 13, wherein acquiring the loss function of each training of the neural network model comprises:

acquiring voiceprint feature information from each training of the neural network model;
processing the voiceprint feature information to remove a relevance between the voiceprint feature information and a channel to which the voiceprint feature information belongs;
inputting the processed voiceprint feature information into the domain classifier of the neural network model; and
acquiring the similarity loss function based on a classification result of the domain classifier of the neural network and a classification correctness probability of output of the neural network model.

16. The non-transitory computer-readable storage medium of claim 15, wherein processing the voiceprint feature information to remove the relevance between the voiceprint feature information and the channel to which the voiceprint feature information belongs comprises:

processing the voiceprint feature information by gradient inversion.

* * * * *